United States Patent
Togami

(10) Patent No.: US 6,505,127 B1
(45) Date of Patent: Jan. 7, 2003

(54) FOREIGN MATERIAL INTERFERENCE DETECTION APPARATUS FOR OPEN/CLOSING MEMBERS

(75) Inventor: Katsutaka Togami, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/530,349

(22) PCT Filed: Feb. 22, 1999

(86) PCT No.: PCT/JP99/00771
§ 371 (c)(1),
(2), (4) Date: Apr. 26, 2000

(87) PCT Pub. No.: WO99/42691
PCT Pub. Date: Aug. 26, 1999

(30) Foreign Application Priority Data

Feb. 23, 1998 (JP) ............................ 10-0940028

(51) Int. Cl.[7] .............................. G06F 19/00
(52) U.S. Cl. ............................ 702/33; 702/35; 702/36; 324/73.1; 324/76.39; 324/117 H; 388/801; 388/804
(58) Field of Search ................ 702/113, 176, 702/85, 96, 213, 99, 33; 180/197; 324/73.1

(56) References Cited

U.S. PATENT DOCUMENTS 4,760,893 A * 8/1988 Sigl ........................ 180/197
5,884,237 A * 3/1999 Kanki et al. ................ 702/113

FOREIGN PATENT DOCUMENTS

| JP | 08121018 | * 5/1996 |
| JP | 8-260810 | 10/1996 |
| JP | 9-217549 | 8/1997 |
| JP | 2845427 | 10/1998 |

OTHER PUBLICATIONS

Craig Marven and Gillian Ewers, A simple Approach to Digital Processing, 1996, pp. 123–127.*

* cited by examiner

Primary Examiner—Marc S. Hoff
Assistant Examiner—Elias Desta
(74) Attorney, Agent, or Firm—Robert D. Buyan; Stout, Uxa, Buyan & Mullins, LLP

(57) ABSTRACT

A foreign material interference detection apparatus for an opening/closing member that reduces the calculation load for foreign material interference determination processing. A rotating speed detection sensor detects the rotating speed of a motor and provides its detection signal SP to a computer. The computer obtains a load determination rotating cycle t1 from the detection signal SP. Based on the load determination rotating cycle t1, the computer determines foreign material interference when it determines that the rotating speed is fluctuating due to a load that is the same as that produced when a foreign material is interfering with the opening/closing member and when the determination is made consecutively a predetermined number of times.

9 Claims, 4 Drawing Sheets

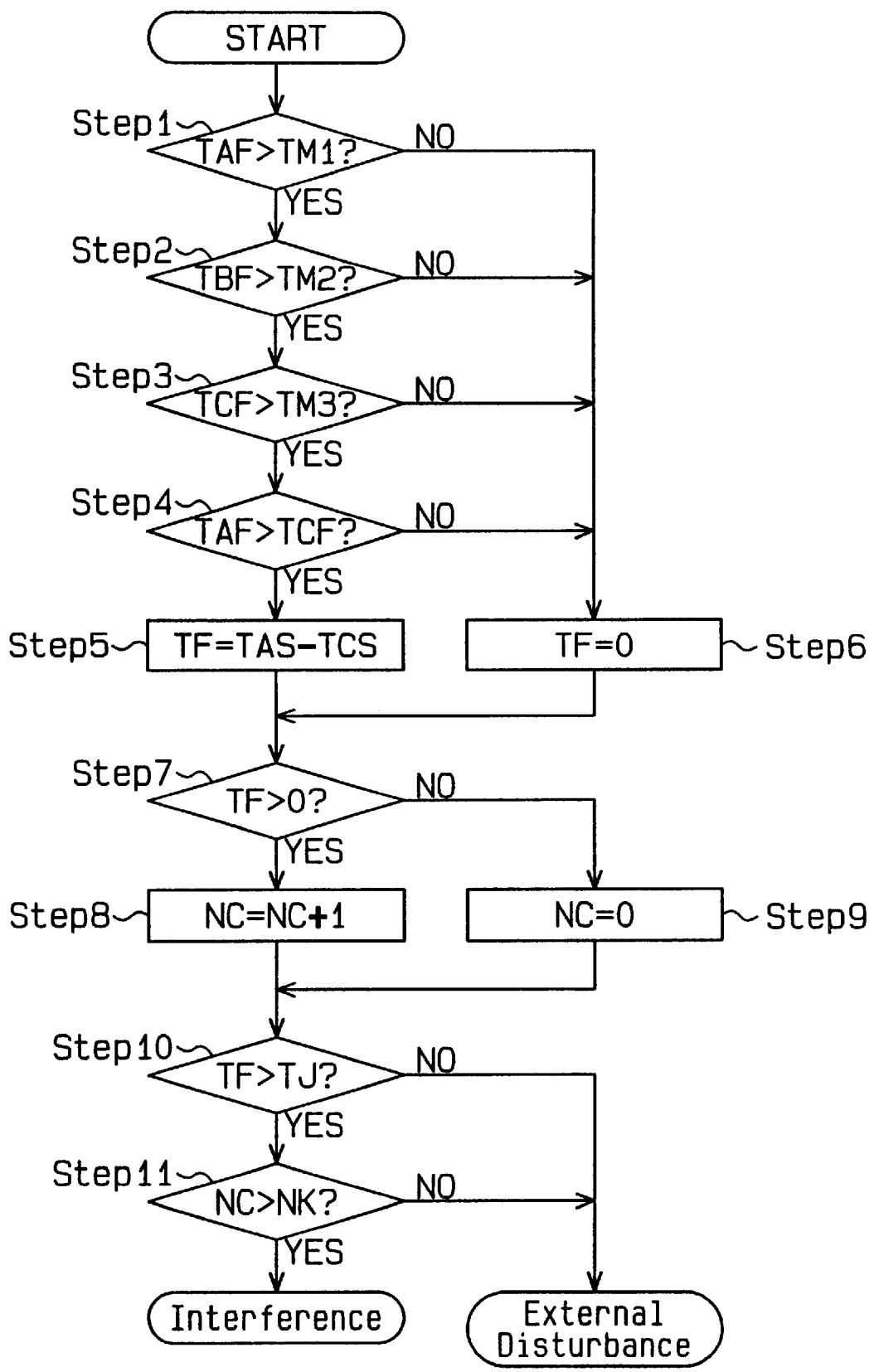

FOREIGN MATERIAL INTERFERENCE DETECTION APPARATUS FOR OPEN/CLOSING MEMBERS

BACKGROUND OF THE INVENTION

The present invention relates to a foreign material interference detection apparatus for opening/closing members, and more particularly, to a foreign material interference detection apparatus for opening/closing members, such as a sliding roof, a power window, and a sliding door.

In the prior art, an automobile sunroof apparatus having a foreign material interference prevention apparatus, similar to that of a power window, has been proposed to detect foreign material interference when a sliding glass roof is being completely closed, to stop immediately the closing action, and move the glass in the opposite, or opening direction.

Generally, the rotating cycle (rotating speed) of a sliding motor for sliding the sliding glass roof is detected, and when the rotating cycle becomes long (when the rotating speed decreases gradually), foreign material interference is detected.

However, when completely closing the sliding glass roof while driving along a rough road, the vibrations applied to the automobile fluctuate the load applied to the sliding motor, which changes the rotating cycle (rotating speed) of the motor. The change in the rotating cycle (rotating speed) results in erroneous detection of foreign material interference.

Accordingly, a method using a digital filter, such as an FIR filter or an IIR filter, has been proposed to eliminate load fluctuations caused by external disturbances, such as vibrations. However, the load applied to the CPU with respect to the computations, such as sum/product calculations, is high. Thus, a CPU having higher speed is necessary. This increases the cost of the foreign material interference prevention apparatus. Further, load fluctuations caused by vibrations cannot be completely eliminated by the digital filter.

It is a first object of the present invention to provide a foreign material interference prevention apparatus that reduces the computation load for determining external disturbance.

It is a second object of the present invention to provide a foreign material interference prevention apparatus that accurately determines foreign material interference by completely eliminating load fluctuations, such as vibrations, while reducing the computation load for detecting interference.

SUMMARY

A first aspect according to the present invention provides a foreign material interference detection apparatus for an opening/closing member. A drive source opens and closes the opening/closing member. A speed detection means detects the opening and closing speed of the opening/closing member and generates a detection signal. A data row dividing processing means obtains the opening and closing speed of the opening/closing member from the detection signal and divides the data into a plurality of groups. A speed fluctuation calculation means calculates fluctuations in the opening and closing speed based on the data of each of the divided groups. An external disturbance determination means compares the calculation result of the speed fluctuation calculation means and a predetermined value to determine an external disturbance. An interference determination means determines whether or not foreign material is interfering with the opening/closing member based on the calculation result of the speed fluctuation calculation means and the determination result of the external disturbance determination means.

A second aspect of the present invention provides a foreign material interference detection apparatus for an opening/closing member. A drive motor opens and closes an opening/closing member. A speed detecting means detects a rotating speed of the drive motor and generates a detection signal. A rotating cycle calculation processing means calculates a rotating cycle as load determination rotating cycles using the detection signal from the speed detecting means. A calculation processing means determines whether the rotating speed is fluctuating due to a load the same as that produced by foreign material interference based on the fluctuated value of the load determination rotating cycles obtained by the rotating cycle calculation processing means and counts the consecutive number of times in which the rotating speed is determined to have fluctuated by a load that is the same as that produced by foreign material interference. An interference determination processing means determines that there is foreign material interference if the calculation processing means determines that the applied load is the same as that produced when foreign material is interfering with the opening/closing member and the determination is made consecutively for a predetermined number of times.

BRIEF DESCRIPTION OF THE DRAWINGS

FIG. 4 is a flowchart illustrating the operation of the sunroof apparatus of FIG. 1.

BEST MODE FOR CARRYING OUT THE INVENTION

An embodiment of an automobile sunroof apparatus according to the present invention will now be described with reference to the drawings.

Figure 3:
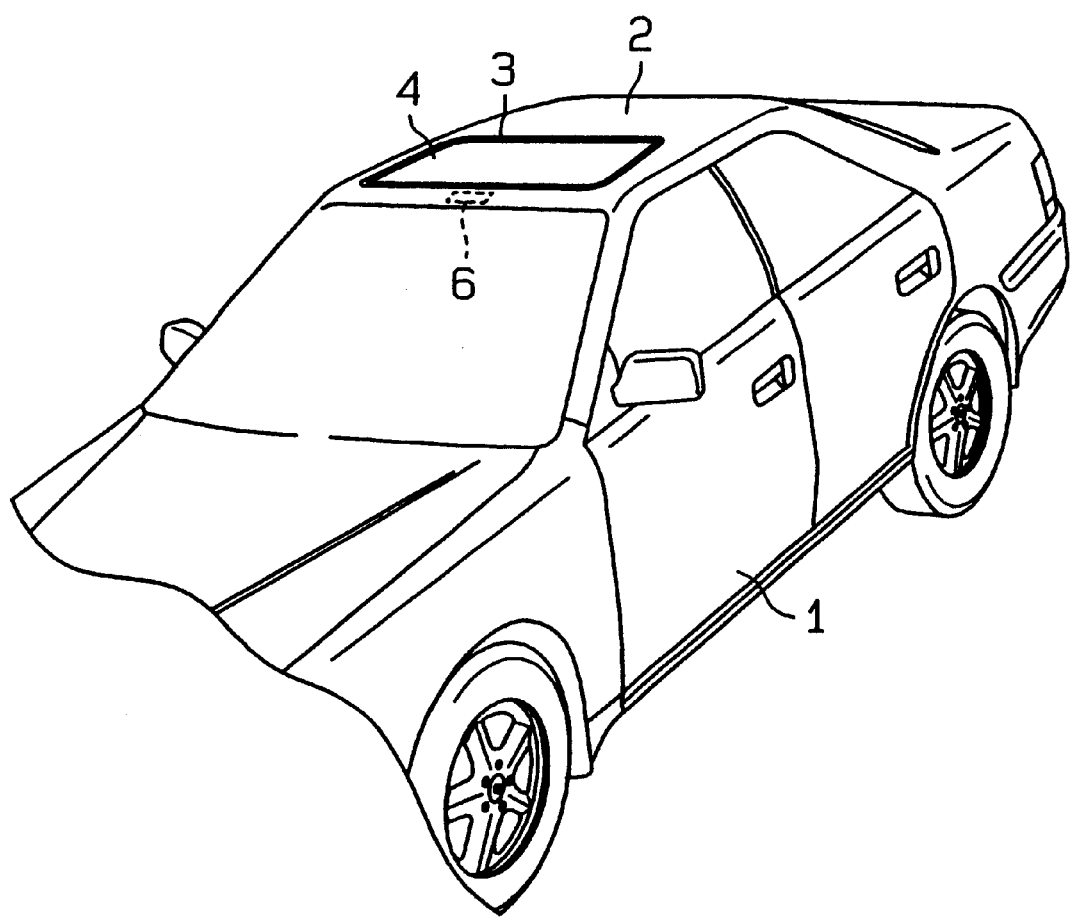
FIG. 3 is a partial perspective view of an automobile having a sunroof apparatus.

FIG. 3 is a perspective view showing an automobile having a sunroof apparatus. The automobile 1 has a roof panel 2 which forms a window 3. A sliding glass roof (hereafter referred to as glass roof) 4 serving as an opening/closing member is arranged in the window 3 and moved back and forth in the forward and rearward directions. The window 3 is opened by moving the glass roof 4 rearward (disengaging movement), and closed by moving the glass roof 4 forward (engaging movement).

The glass roof 4 is moved back and forth (opening/closing operation) by the forward and reverse rotating actions of a sliding roof motor (hereafter referred to as motor) 6, which is a DC motor serving as a drive motor (drive source) and shown by the broken lines in FIG. 3. The forward rotating action of the motor 6 moves the glass roof 4 by means of a drive transmission mechanism (not shown) in the direction that opens the window 3 (disengaging movement). On the other hand, the reverse rotating action of the motor 6 moves the glass roof 4 by means of the drive transmission mechanism in the direction that closes the window 3 (engaging movement). The rotating speed NS of the motor 6 is in relative relationship with the moving speed (i.e., opening/closing speed) of the glass roof 4. The motor 6 is fixed between the roof panel 2 and a molded roof panel (not shown) in front of the window 3.

Figure 1:
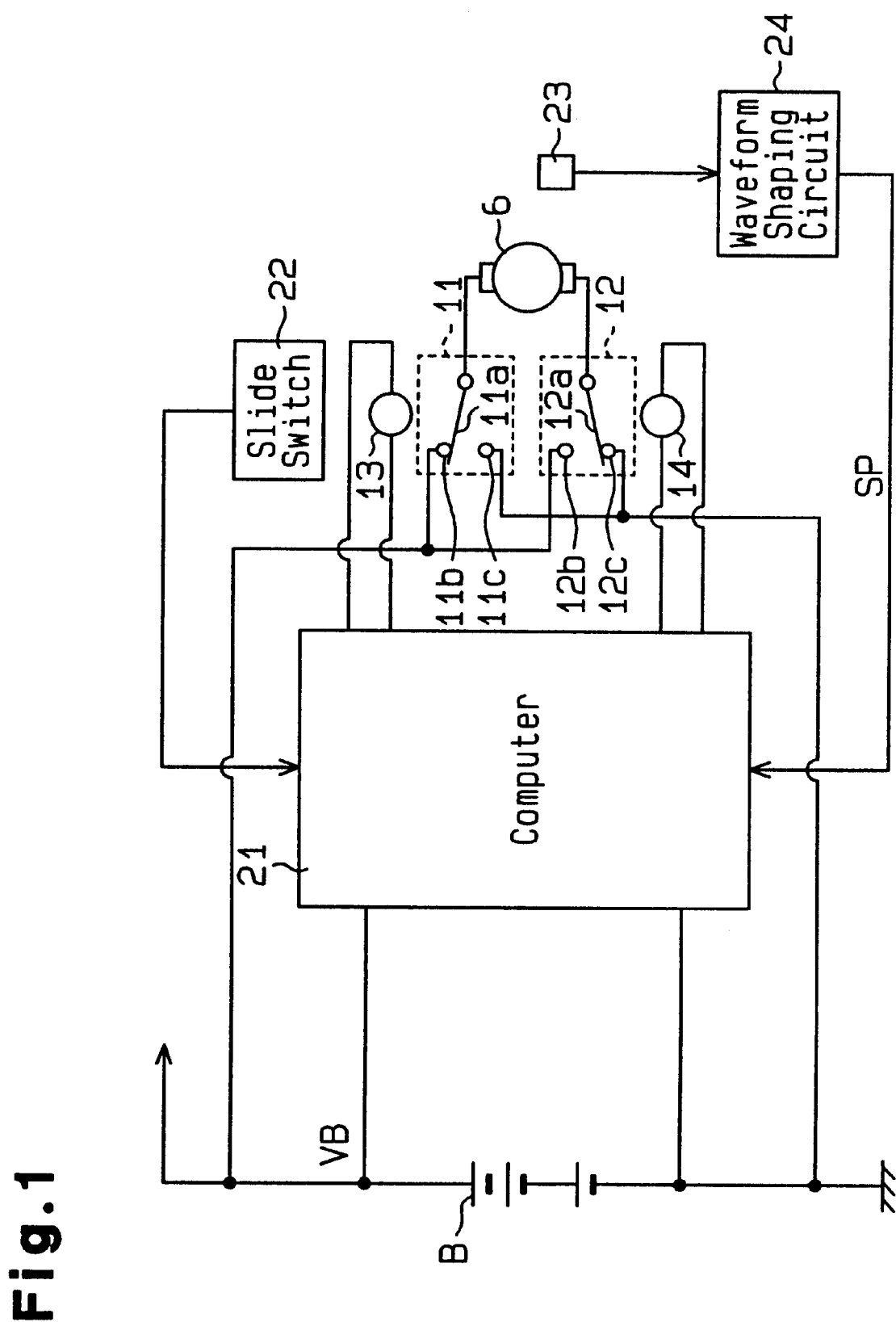
FIG. 1 is a schematic block diagram of a sunroof apparatus according to a first embodiment of the present invention.

FIG. 1 is a schematic block diagram of the sunroof apparatus. The motor 6 has a first terminal connected to a first relay switch 11 and a second terminal connected to a second relay switch 12. The first relay switch 11 has a plus contact 11*b* connected to a plus terminal of a battery B of the automobile 1, a minus contact 11*c* connected to a minus terminal of the battery B, and a movable contact 11*a* connected to the first terminal of the motor 6. In this embodiment, the movable contact 11*a* is connected to the plus contact 11*b* when a first relay coil 13 is excited and connected to the minus contact 11*c* when the first relay coil 13 is de-excited.

The second relay switch 12 has a plus contact 12*b* connected to a plus terminal of the battery B, a minus contact 12*c* connected to a minus terminal of the battery B, and a movable contact 12*a* connected to the second terminal of the motor 6. In this embodiment, the movable contact 12*a* is connected to the plus contact 12*b* when a second relay coil 14 is excited and connected to the minus contact 12*c* when the second relay coil 14 is de-excited.

Accordingly, when the first relay coil 13 is excited and the second relay coil 14 is de-excited, the movable contact 11*a* of the first relay switch 11 is connected to the plus contact 11*b*, and the movable contact 12*a* of the second relay switch 12 is connected to the minus contact 12*c*. As a result, current flows from the plus terminal of the battery B through the first relay switch 11, the motor 6, the second relay switch 12, and to the minus terminal of the battery B. This produces the forward rotating action of the motor 6 and moves the glass roof 4 in the opening direction.

On the other hand, when the first relay coil 13 is de-excited and the second relay coil 14 is excited, the movable contact 11*a* of the first relay switch 11 is connected to the minus contact 11*c*, and the movable contact 12*a* of the second relay switch 12 is connected to the plus contact 12*b*. As a result, current flows from the plus terminal of the battery B through the second relay switch 12, the motor 6, the first relay switch 11, and to the minus terminal of the battery B. This produces the reverse rotating action of the motor 6 and moves the glass roof 4 in the closing direction.

When the first and second relay coils 13, 14 are both de-excited, the movable contacts 11*a*, 12*a* of the first and second relay switches 11, 12 are connected to the minus contacts 11*c*, 12*c*, respectively. As a result, the DC voltage VB of the battery B is not applied to the motor 6. Thus, the motor 6 does not produce rotating actions.

A computer or microcomputer 21 includes a central processing unit (CPU) for performing various calculations based on control programs, a read only memory (ROM) for storing the control programs and various data, a readable and rewritable memory (RAM) for temporarily storing various data such as the processed calculation results of the CPU, and an input/output interface (I/O). The computer 21 further includes a constant voltage power supply circuit, an AD converter, and internal circuits, such as a drive circuit, for exciting the first and second relay coils 13, 14.

The computer 21 is connected to the battery B and is supplied with the DC voltage VB from the battery B for operational power. The constant voltage power supply circuit converts the DC voltage VB of the battery B to a predetermined voltage in order to generate the operational power of the internal circuits in the computer 21, such as the CPU, the ROM, the RAM, and the I/O.

The computer 21 is provided with an operation signal from a slide switch 22. The slide switch 22 is located on the molded roof panel above the rear view mirror in the passenger compartment. The slide switch 22 includes an opening operation portion and a closing operation portion. When the opening operation portion is operated, the slide switch 22 provides an open signal to the computer 21. When the closing operation portion is operated, the slide switch 22 provides a close signal to the computer 21.

In response to the open signal from the slide switch 22, the computer 21 excites the first relay coil 13 and de-excites the second relay coil 14 in accordance with the control program to produce the forward rotating action of the motor 6. In response to the close signal from the slide switch 22, the computer 21 excites the second relay coil 14 and de-excites the first relay coil 13 in accordance with the control program to produce the reverse rotating action of the motor 6. Further, when neither the open signal nor the close signal are being input, the computer 21 de-excites the first and second relay coils 13, 14, which stops the rotating action of the motor 6.

When determining that interference by a foreign material has occurred during the reverse rotating action of the motor 6, the computer 21 switches the excited and de-excited states of the first and second relay coils 13, 14 so that the motor 6 produces a forward rotating action.

The computer 21 receives a detection signal from a rotating speed detection sensor 23, which detects the rotating speed NS of the motor 6, via a waveform shaping circuit 24. The rotating speed detection sensor 23 is fixed to a rotary shaft of the motor 6 and includes a disk-like magnet, which rotates integrally with the rotary shaft, and a Hall element, which is arranged to face the magnet (neither shown). An N-pole surface ranging 180 degrees and an S-pole surface ranging 180 degrees is defined on the surface of the disk-like magnet with the boundary therebetween extending along a line segment that is perpendicular to the rotary shaft axis. The length of the N-pole surface is the same as the length of the S-pole surface. The lengths of the N and S-pole surfaces refer to a one half rotation of the rotary shaft. Accordingly, when the magnet is rotated integrally with the rotary shaft, the N-pole and S-pole surfaces alternately pass by the Hall element every half rotation. In this embodiment, the detection signal output by the rotating speed detection sensor 23 has a high potential (high level) when the Hall element passes by the N-pole surface and a low potential (low level) when the Hall element passes by the S-pole surface.

Figure 2:
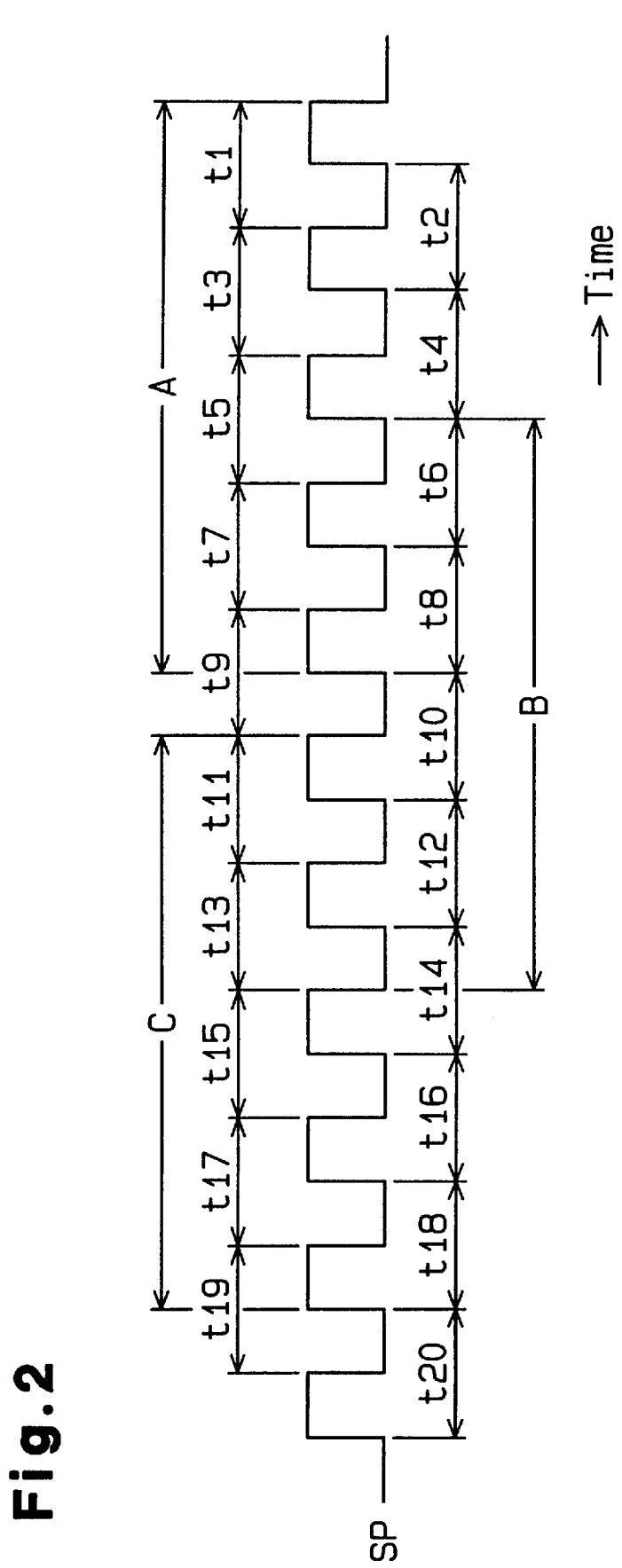
FIG. 2 is a timing chart of the waveform of a detection signal generated by a waveform shaping circuit of the sunroof apparatus of FIG. 1.

The waveform shaping circuit 24 receives the detection signal from the rotating speed detection sensor 23, shapes the waveform of the detection signal, and provides a pulse waveform detection signal SP, which has sharp rising and falling edges as shown in FIG. 2, to the computer 21. The rotating speed detection sensor 23 and the waveform shaping circuit 24 form a speed detection means.

When the glass roof 4 is being closed, a foreign material may interfere with the closing of the glass roof 4 and apply a load to the motor 6, the DC voltage VB provided to the motor 6 may drop, or vibrations produced when driving along rough roads may apply a load to the motor 6. In such cases, the rotating speed NS of the motor 6 decreases. A decrease in the rotating speed NS lengthens a rotating cycle t1 of the detection signal SP.

The computer 21 serves as an interference determination processing means and performs interference detection processing based on a correction voltage VBF and the detection signal SP. That is, the computer 21 performs interference detection processing in accordance with the control program during the reverse rotating action of the motor 6 (when the glass roof 4 is being moved in the closing direction). The interference detection processing includes rotating cycle calculation processing, external disturbance determination processing, and interference determination processing.

Rotating Cycle Calculation

The detection signal SP from the waveform shaping circuit 24 is repetitively calculated and the calculation result is stored in the RAM. More specifically, with reference to FIG. 2, whenever the detection signal SP falls to a low level from a high level, the computer 21 calculates the time t1 between the preceding falling edge and the current falling edge of the detection signal SP (actual rotating cycles t1, t3, t5, ... ). Further, whenever the detection signal SP rises to a high level from a low level, the computer 21 calculates the time t2 between the preceding rising edge and the current rising edge of the detection signal SP (actual rotating cycles t2, t4, t6, ... ). The computed actual rotating cycles are stored in the RAM of the computer 21 from the newest one as load determination rotating cycles t1, t3, ... , t2, t4, ... .

Referring to FIG. 2, in this embodiment, nine load determination rotating cycles t1, t3, t5, ... , t15, t17 are stored in the RAM when the detection signal SP falls. Nine load determination rotating cycles t2, t4, t6, ... , t16, t18 are stored in the RAM when the detection signal SP rises. When the detection signal SP next falls, among the eighteen load determination rotating cycles t1–t18, the oldest load determination rotating cycle 18 is updated with the newly calculated load determination rotating cycle. Accordingly, eighteen load determination rotating cycles t1, t3, t17, t2, t4, ... , t18 are stored in the RAM and updated at each rising edge and falling edge. The computer 21 performs external disturbance determination processing using the eighteen load determination rotational cycles t1, t2–t18 stored in the RAM. The determination processing is performed whenever the load determination rotating cycle t1–t18 is updated.

External Disturbance Determination Processing

The actual changes in the rotating speed NS relative to the fluctuations of the DC voltage VB are eliminated from the eighteen load determination rotating cycles t1–t18 stored in the RAM. However, the changes in the rotating speed NS relative to the fluctuations of the load applied to the motor 6 are included in the eighteen load determination rotating cycles t1–t18. The load applied to the motor 6 includes the load produced when a foreign material interferes with the closing of the glass roof 4, the load produced by external disturbances such as vibrations generated when driving along rough roads, and the load produced by external disturbances other than vibrations. External disturbance determination processing is performed by determining the load applied to the motor 6 using the eighteen load determination rotating cycles t1–t18.

The external disturbance determination processing includes low range differential calculation processing and interference bias determination processing.

1. Low Range Differential Calculation Processing

The low range differential calculation processing includes data row dividing processing and speed fluctuation calculation processing. The computer 21 divides the eighteen load determination rotating cycles into three data rows of groups A, B, and C. The first group A is formed by the four rising edge load determination rotating cycles t1, t3, t5, t7 and the four falling edge load determination rotating cycles t2, t4, t6, t8. The second group B is formed by the four rising edge load determination rotating cycles t7, t9, t11, t13 and the four falling edge load determination rotating cycles t6, t8, t10, t12. The third group C is formed by the four rising edge load determination rotating cycles t11, t13, t15, t17 and the four falling edge load determination rotating cycles t12, t14, t16, t18.

Then, the computer 21 calculates a low range differential value TAF as the fluctuation value of the first group A from the eight load determination rotating cycles t1–t8 using the following equation.

$$TAF=(t1+t2+t3+t4)-(t5+t6+t7+t8)$$

In the same manner, the computer 21 calculates low range differential values TBF, TCF as the fluctuation values of the second and third groups B, C from the eight load determination rotating cycles t8–t13 of the second group C and the eight load determination rotating cycles t11–t18 of the third group C using the following equations, respectively.

$$TBF=(t6+t7+t8+t9)-(t10+t11+t12+t13)$$

$$TCF=(t11+t12+t13+t14)-(t15+t16+t17+t18)$$

The low range differential values TAF, TBF, TCF are the deviations of the load determination rotation cycle for each rotation. The low range differential value TAF of the first group A is the deviation of the most recent load determination rotating cycle, and the low range differential value TBF of the second group B is the deviation of the next most recent load determination rotating cycle. The low range differential value TCF of the third group C is the deviation of the load determination rotating cycle that is next most recent to the second group B. Accordingly, the low range differential values TAF, TBF, TCF having positive values indicate a decrease in the rotating speed NS due to a load during the corresponding period of time.

The computer 21 then performs sum calculation processing to obtain sum values TAS, TCS of the first and third groups A, C used during rotating speed fluctuation calculation processing, which will be described later. The sum values TAS, TCS are obtained from the eight load determination rotating cycles of the first and third groups A, C using the following equations.

$$TAS=(t1+t2+t3+t4)+(t5+t6+t7+t8)$$

$$TCS=(t11+t12+t13+t14)+(t15+t16+t17+t18)$$

After obtaining the low range differential values TAF, TBF, TCF and the sum values TAS, TCS, the computer 21 finishes calculating the low range differential and proceeds to interference bias determination processing.

2. Interference Bias Determination Processing

The computer 21 performs interference bias determination processing in accordance with the flowchart of FIG. 4.

The interference bias determination processing includes external disturbance determination processing, which determines whether the low range differential values TAF, TBF, TCF are greater than their corresponding threshold values TM1, TM2, TM3 (steps 1–3). In other words, it is determined whether the conditions of TAF>TM1, TBF>TM2, and TCF>TM3 are satisfied.

The threshold values TM1, TM2, TM3 are values that are obtained beforehand through tests, such as experiments. The threshold values TM1, TM2, TM3 are the low range differential values TAF, TBF, TCF obtained when the rotating speed NS is decreased due to a load that is greater than a load generated by external disturbances (i.e., an initial load produced when a foreign material interferes with the glass roof 4). Accordingly, the low range differential values TAF, TBF, TCF obtained when an external disturbance or the like produces a load are equal to or lower than the threshold values TM1, TM2, TM3. The threshold values TM1, TM2, TM3 are stored in the ROM of the computer 21. Accordingly, when the low range differential values TAF, TBF, TCF are greater than the threshold values TM1, TM2, TM3, this indicates that a load has been applied to the glass roof 4, or the motor 6, due to some reason in the respective groups A–C.

When it is determined that the conditions of steps 1–3 are satisfied and the load applied to the motor 6 has increased during the time period corresponding to each of the groups A–C, the computer 21 compares the low range differential value TAF of the first group A with the low range differential value TCF of the third group C to determine whether the load is increasing (step 4). When the low range differential value TAF is greater than the low range differential value TCF (i.e., TAF>TCF), it is determined that the glass roof 4, which is moving in the closing direction, is likely being interfered with by a foreign material. That is, if the low range differential value TCF of the older, third group C is greater than the low range differential value TAF of the newer, first group A, this indicates that a foreign material has begun to interfere with the glass roof 4 and the load is likely to gradually increase.

When it is determined that the glass roof 4 is likely being interfered with by a foreign material, the computer 21 proceeds to the rotating speed fluctuation calculation processing. If the conditions of TAF>TM1, TBF>TM2, TCF>TM3, and TAF>TCF are not satisfied, it is determined that there is no likelihood of foreign material interference. The computer 21 thus proceeds to the rotating speed fluctuation calculation processing.

Rotating Speed Fluctuation Calculation Processing

When it is determined in the interference bias determination process that the glass roof 4 is likely being interfered with by a foreign material, the computer 21 uses the sum values TAS, TCS of the respective first and third groups A, C to obtain a new low range differential value TF using the following equation (step 5).

TF=TAS−TCS =(t1+t2+t3+t4+t5+t6+t7+t8) −(t11+t12+t13+t14+t15+t16+t17+t18)

The low range differential value TF is a cycle fluctuation amount related to the fluctuation of the rotating speed NS, which is obtained by comparing the rotating speed NS of the third group C that is prior to the second group B with the newest rotating speed NS of the first group A. Accordingly, when the low range differential value TF is positive (TF>0), the rotating speed NS is definitely decreasing. If it is determined that the rotating speed N has fluctuated due to external disturbance in steps 1 to 5, the computer 21 sets TF at zero without computing the low range differential value TF (step 6).

At step 7, the computer 21 determines whether the low range differential value TF is positive (TF>0) and, if it is positive, proceeds to step 8 to add "1" to a count value NC of a determination counter, which is incorporated in the CPU. Accordingly, if the low range differential value TF is positive (TF>0), the counter value NC is increased in an incremental manner whenever the low range differential value TF is obtained. Accordingly, as the count value NC increases, it becomes apparent that the rotating speed NC is definitely being decreased (i.e., the load applied to the motor 6 being increased).

If the low range differential value TF is "0" or negative (TF<0), the computer 21 proceeds to step 9 and resets the count value NC to "0". In this case, it is apparent that a state in which the rotating speed NS is decreasing (i.e., the load applied to the motor 6 being increased) no longer exists.

The computer 21 then proceeds to step 10 and compares the low range differential value TF with a predetermined reference value TJ prestored in the ROM. The reference value TJ is a value previously obtained from the torque/rotating speed characteristic of the motor 6. In other words, the reference value TJ is a low range differential value TJ obtained when the rotating speed NS decreases due to a foreign material interfering with the glass roof 4. Accordingly, if the low range differential value TF is greater than the reference value TJ, it is determined that the load applied to the motor 6 is substantially the same as when a foreign material interferes with the glass roof 4.

When the condition of step 10 is satisfied, the computer 21 determines that the load applied to the motor 6 is substantially the same as that when a foreign material is interfering with the glass roof 4 and proceeds to the interference determination processing of step 11.

Interference Determination Processing

During interference determination processing in step 11, the computer 21 compares the count value NC of the determination counter with a predetermined determination value NK prestored in the ROM. The determination value NK is obtained beforehand through tests, such as experiments. That is, the determination value NK is the count value NC at which an increase in the counter value NC due to a decrease in the rotating speed NS and an increase in the load applied to the motor 6 can first be confirmed to be caused by a foreign material interfering with the glass roof 4.

When the count value NS exceeds the determination value NK, the computer 21 determines that a foreign material is interfering with the glass roof 4 and finishes the interference determination process. The computer 21 then waits again for the rising edge or falling edge of the next detection signal SP and continues performing the foreign material interference detection processing, which includes the rotating cycle calculation processing, the external disturbance determination processing, the rotating speed fluctuation calculation processing, and the interference determination processing.

On the other hand, if the count value NS is equal to or less than the determination value NK (NS≦NK), it is determined that the time is too short to determine interference by a foreign material and the determination processing is terminated. The computer 21 then waits again for the rising edge or falling edge of the next detection signal SP and continues to perform the foreign material interference detection processing. In other words, if the load applied to the motor 6 fluctuates temporarily due to vibrations or the like, the increase in the load stops before the count value NS reaches the determination value NK and the count value NS is reset. Accordingly, when the load applied to the motor 6 fluctuates temporarily, the computer 21 does not erroneously determine that a foreign material is interfering with the glass roof 4.

When the computer 21 determines that a foreign material is interfering with the glass roof 4, the computer 21 performs interference elimination processing. When the glass roof 4 is being moved in the closing direction, the glass roof 4 is immediately moved in the opening direction by the interference elimination processing. In other words, the computer 21 excites the first relay coil 13 and de-excites the second relay coil 14 to cause the motor 6 to produce a forward rotating action. In this manner, the foreign material interfering with the glass roof 4 is released from the glass 4.

The features of the sunroof apparatus according to the present invention will be discussed below.

(1) The opening/closing speed of the glass roof 4 is represented by the rotating speed of the motor 6 and detected by the rotating speed detection sensor 23. Accordingly, the rotating speed, or the opening/closing speed is detected with a relatively simple structure in comparison to when directly detecting the opening/closing speed of the glass roof 4.

(2) During the low range differential calculation processing, the computer 21 selects the newest eighteen load determination rotating cycles, divides the eighteen load determination rotating cycles chronologically into a plurality of groups (data rows), and obtains the low range differential values TAF, TBF, TCF associated with each group from the corresponding load determination rotating cycles. Further, during the interference bias determination processing, the low range differential values TAF, TBF, TCF of each group A, B, C and the respective predetermined threshold values TM1, TM2, TM3 are compared to each other, and the TAF, TCF of the respective groups A, C are compared to each other to determine whether the rotating speed NS is fluctuating due to a load and whether there is a likelihood of interference.

If it is determined that there is a likelihood of interference during the rotating speed fluctuation calculation processing, the low range differential value TF is obtained using the sum values TAS, TCS of the load determination rotating cycles in the respective groups A, C to determine whether the rotating speed NS is decreasing based on the differential value TF. The low range differential value TF is compared to the predetermined value TJ and, based on the comparison result, a calculation is performed to determine whether the rotating speed of the motor 6 has decreased and whether the load applied to the motor 6 is substantially the same as a foreign material interference state. During the interference determination processing, it is determined that the load applied to the motor 6 is the same as that applied during a foreign material interference state, and when the count value NC of the determination counter reaches the predetermined value NK, it is determined that there is no external disturbance resulting from vibrations or the like but that there is interference.

Accordingly, for example, interference is not determined when the opening/closing speed of the glass roof 4 decreases in a short time period due to vibrations or the like. As a result, interference is determined with high accuracy.

(3) In the present embodiment, the glass roof 4 is moved in the opening direction when it is determined that there is interference. In this manner, the foreign material is immediately released from the glass roof 4 without being damaged.

(4) In the present embodiment, the interference detection determination is performed using the actual rotating cycles t1, T2 . . . , which are extracted from the detection signal SP. Accordingly, foreign material interference determination is performed with a simple calculation without requiring an expensive digital filter.

(5) In the present embodiment, it is determined that there is external disturbance when the conditions of TAF>TM1, TBF>TM2, TCF>TM3 are not satisfied during the interference bias determination processing. In other words, each of the low range differential values TAF, TBF, TCF, which are subject to determination, are obtained from the load determination rotating cycles t1–t18, which are easily obtained from the detection signal SP. Accordingly, the signal processing of the detection signal SP and the calculation processing, or the calculation processing for determining external disturbance is simplified.

(6) In the present embodiment, it is determined that there is external disturbance when the condition of low range differential value TF (TAS−TCS)>0 is not satisfied during the rotating speed fluctuation processing. That is, the low range differential value TF is the deviation of the sum values TAS, TCS obtained in the sum calculation process. The sum values TAS, TCS are derived from the load determination rotating cycles t1–t18, which are easily obtained from the detection signal SP of the rotating speed detection sensor 23. Accordingly, the signal processing of the detection signal and the calculation processing, or the calculation processing for determining external disturbance, are simplified.

The above embodiment may be modified as described below.

The present invention may be applied to a foreign material interference detection apparatus for a power window apparatus, a slide door apparatus, or the like. Further, the present invention may be applied to a foreign material interference detection apparatus for an apparatus having an opening/closing member that opens and closes through a motion other than sliding, such as a rotating motion.

During the interference bias determination, interference bias is determined using the conditions of TAF>TM1, TBF>TM2, TCF>TM3, and TAF>TCF. However, this may be determined through the condition of only TAF>TCF or through the conditions of only TAF>TM1, TBF>TM2, TCF>TM3.

TAF, TBF, TCF may each be compared to one another after adding a coefficient thereto.

The conditions of TAF>TM1, TBF>TM2, TCF>TM3 may be changed to, for example, TAF>TM1, TBF>TM2 or TAF>TM1, TCF>TM3.

In the above embodiment, the three groups A, B, C are formed. However, two groups A, B or four or more groups may be formed instead.

In the above embodiment, the groups A, B, C are each formed from eight load determination rotating cycles but may be formed from two to seven or from nine or more load determination rotating cycles.

What is claimed is:

1. A foreign material interference detection apparatus for opening/closing member, comprising:

a drive source for opening and closing the opening/closing member;

a speed detection means for detecting the closing speed of the opening/closing member and generating a speed detection signal (SP);

a data row dividing processing means for obtaining data of the closing speed of the opening/closing member from the detection signal (SP) and dividing the data into a plurality of groups;

a speed fluctuation calculation means for calculating fluctuations in the closing speed based on the data of at least one of the divided groups;

an external disturbance determination means for comparing a calculation result of the speed fluctuation calculation means with a predetermined value to determine and external disturbance; and an interference determination means for determining whether foreign material is interfering with the closing of the opening/closing member based on the speed fluctuation calculation result and the determination result of the external disturbance determination means.

2. The foreign material interference detection apparatus according to claim 1, wherein the speed fluctuation calculation means includes a low range differential calculation processing means for obtaining a fluctuation value of the closing speed of the at least one of the divided groups based on a load determination cycle of the at least one of the divided group, and wherein the external disturbance means includes an interference bias determination processing means for comparing the fluctuation value of each of the divided groups obtained by the low range differential calculation processing means with respective predetermined threshold values, and comparing at least two of the fluctuation values of the divided groups to determine whether the closing speed is fluctuating due to a load and whether there is a likelihood of interference.

3. The foreign material interference detection apparatus for an opening/closing member according to claim 1, wherein the speed fluctuation calculation means includes:

a sum calculation processing means for selecting at least two of the divided groups and adding the respective load determination cycles in each of the at least two selected groups to obtain sum values; and a rotating speed fluctuation processing means for obtaining a deviation value (TF) of the sum values obtained by the sum calculation processing means, determining whether the closing speed (NS) is decreasing based on the deviation value (TF), comparing the deviation value (TF) with a predetermined reference value (TJ), and determining whether the load being applied is the same as that when a foreign material is interfering with the opening/closing member based on the comparison result.

4. A foreign material interference detection apparatus for opening/closing member, comprising:

a drive motor for opening and closing the opening/closing member;

a speed detecting means for detecting a rotating speed (NS) of the drive motor and generating a detection signal (SP);

a rotating cycle calculation processing means for calculating load determination rotating cycles from the detection signal (SP);

a calculation processing means for determining whether the rotating speed (NS) is fluctuating due to a load that is the same as that produced by foreign material interference based on fluctuations in the load determination rotating cycles obtained by the rotating cycle calculation processing means and counting the consecutive number of times in which the rotating speed is determined to be fluctuating due to a load that is the same as that produced by foreign material interference; and an interference determination processing means for determining foreign material interference if the calculation processing means determines that the load is the same as that produced when foreign material is interfering with the opening/closing member and the determination is made consecutively a predetermined number of times.

5. The foreign material interference detection apparatus according to claim 4, wherein the calculation processing means includes:

a low range differential calculation processing means for selecting a predetermined number of the load determination rotating cycles calculated by the rotating cycle calculation processing means, dividing the selected number of the load determination rotating cycles chronologically into a plurality of groups, and obtaining a rotating speed fluctuation value of each group from the load determination rotating cycle of each group;

a sum calculation processing means for selecting at least two groups from the groups (A, B, C) and adding the load determination rotating cycles in each of the at least two selected groups to obtain sum values (TAS, TCS);

an interference bias determination processing means for comparing the fluctuation values of each group obtained by the low range differential calculation processing means with a predetermined threshold value (TM1, TM2, TM3), respectively, and comparing at least two of the fluctuation values (TAF, TBF, TCF) of the groups to determine whether the rotating speed is fluctuating due to a load and whether there is a likelihood of foreign material interference;

a rotating speed fluctuation calculation processing means for obtaining a deviation value (TF) of the sum values (TAS, TCS) when the interference bias determination processing means determines that there is a likelihood of foreign material interference, determining whether the rotating speed (NS) is decreasing based on the deviation value (TF), comparing the deviation value (TF) with a predetermined reference value (TJ), and determining whether the load being applied is the same as that when a foreign material is interfering with the opening/closing member based on the comparison result; and a determination counter for adding a count value (NC) when the rotating speed fluctuation calculation processing means determines that the closing speed (NS) is decreasing, and resetting the count value (NC) to a predetermined value when the rotating speed fluctuation calculation processing means determines that the rotating speed (NS) is not decreasing; and wherein the interference determination processing means determines there is foreign material interference when the rotating speed fluctuation calculation processing means determines that the load is the same as that when there is foreign material interference and the count value (NC) of determination counter reaches a predetermined judgment value (NK).

6. The foreign material interference detection apparatus for an opening/closing member according to claim 4, further comprising:

an interference elimination processing means for driving the drive motor in reverse when the interference determination processing means determines that there is foreign material interference.

7. The foreign material interference detection apparatus for an opening/closing member according to claim 5, further comprising:

an interference elimination processing means for driving the drive motor in reverse when the interference determination processing means determines that there is foreign material interference.

8. A foreign material interference detection apparatus for an opening/closing member, comprising:

a drive source for opening and closing the opening/closing member;

a speed detection unit for detecting the closing speed of the opening/closing member and generating a pulse detection signal; and a processing unit coupled to the speed detection unit for determining whether foreign material is interfering with the closing of the opening/closing member using the pulse detection signal, wherein the processing unit performs:

obtaining data of the closing speed of the opening/closing member from the detection signal and dividing the data into a plurality of data row groups, each group comprising plural pieces of data of rising and falling edge cycles of the pulse detection signal, calculating fluctuations in the closing speed based on the data of at least one of the divided data row groups, comparing a calculation result with a predetermined value to determine an external disturbance, and determining whether foreign material is interfering with the closing of the opening/closing member based on the speed fluctuation calculation result and the determination result of the external disturbance.

9. A foreign material interference detection apparatus for an opening/closing member, comprising:

a drive motor for opening and closing the opening/closing member;

a speed detecting unit for detecting a rotating speed of the drive motor and generating a detection signal; and a processing unit coupled to the speed detecting unit for determining whether foreign material is interfering with the closing of the opening/closing member using the speed detection signal, wherein the processing unit performs:

calculating load determination rotating cycles from the detection signal, determining whether the rotating speed is fluctuating due to a load that is the same as that produced by foreign material interference based on fluctuations in the load determination rotating cycles and counting the consecutive number of times in which the rotating speed is determined to be fluctuating due to a load that is the same as that produced by foreign material interference, and determining foreign material interference if the calculation processing means determines that the load is the same as that produced when foreign material is interfering with the opening/closing member and the determination is made consecutively a predetermined number of times.

* * * * *

UNITED STATES PATENT AND TRADEMARK OFFICE
CERTIFICATE OF CORRECTION

PATENT NO. : 6,505,127 B1  Page 1 of 1
DATED : January 7, 2003
INVENTOR(S) : Katsutaka Togami It is certified that error appears in the above-identified patent and that said Letters Patent is hereby corrected as shown below:

<u>Title page,</u>
Item [30] Foreign Application Priority Data, please change application No. to:
-- 10-040028 --

Signed and Sealed this

Seventh Day of October, 2003

JAMES E. ROGAN
*Director of the United States Patent and Trademark Office*